United States Patent [19]
Gonidec et al.

[11] Patent Number: 6,009,702
[45] Date of Patent: Jan. 4, 2000

[54] PIVOTING DOOR THRUST REVERSER WITH LATERALLY PIVOTING AUXILIARY PANEL

[75] Inventors: Patrick Gonidec, Montivilliers; Gérard Pascal Rouyer, Saint Aubin Routot; Bernard Guy Vauchel, Le Havre, all of France

[73] Assignee: Société Hispano-Suiza, Paris, France

[21] Appl. No.: 08/856,175

[22] Filed: May 14, 1997

[30] Foreign Application Priority Data

May 15, 1996 [FR] France ................................ 96 06045

[51] Int. Cl.[7] ...................................................... F02R 3/02
[52] U.S. Cl. ..................... 60/230; 60/226.2; 239/265.37; 244/110 B
[58] Field of Search ................................... 60/226.2, 230, 60/262; 239/265.33, 265.37; 244/110 B

[56] References Cited

U.S. PATENT DOCUMENTS

| | | |
|---|---|---|
| 3,279,182 | 10/1966 | Helimintoller . |
| 3,605,411 | 9/1971 | Maison et al. . |
| 3,739,582 | 6/1973 | Maison ................................... 60/226.2 |
| 4,894,985 | 1/1990 | Dubois et al. . |
| 5,039,171 | 8/1991 | Lore . |
| 5,297,387 | 3/1994 | Carimali et al. . |
| 5,782,434 | 7/1998 | Jean ................................... 239/265.37 |
| 5,806,302 | 9/1998 | Cariola et al. ........................... 60/226.2 |

FOREIGN PATENT DOCUMENTS

| | | |
|---|---|---|
| 0 413 635 | 2/1991 | European Pat. Off. . |
| 1.482.538 | 5/1967 | France . |
| 2.030.034 | 10/1970 | France . |
| 2 618 853 | 2/1989 | France . |
| 2 680 547 | 2/1993 | France . |

*Primary Examiner*—Charles G. Freay
*Attorney, Agent, or Firm*—Bacon & Thomas, PLLC

[57] ABSTRACT

A thrust reverser is disclosed for a turbojet engine having a cowling forming an outer boundary of a gas flow duct through which gases flow from a front to a rear, the cowling having at least one reverse thrust opening communicating with the gas flow duct and a thrust reverser door pivotally connected to the cowling so as to move between a forward thrust position wherein the thrust reverser door covers the reverse thrust opening, and a reverse thrust position wherein the reverse thrust opening is uncovered and the thrust reverser door directs at least a portion of the gases flowing through the duct through the reverse thrust opening. The thrust reverser also includes at least one panel having an inner surface, a first lateral side pivotally connected to the cowling so as to pivot about a panel pivot axis extending generally parallel to the gas flow direction through the duct and an actuating mechanism connected to a second lateral side of the panel so as to move the panel about the panel pivot axis between a first position in which the inner surface forms a portion of the outer boundary of the gas flow duct and a second position wherein the second lateral side is disposed within the gas flow duct. The actuating mechanism may include a mechanical linkage interconnecting the second lateral side of the panel to the thrust reverser door such that movement of the thrust reverser door between the forward and reverse thrust positions causes movement of the panel between the first and second positions.

11 Claims, 8 Drawing Sheets

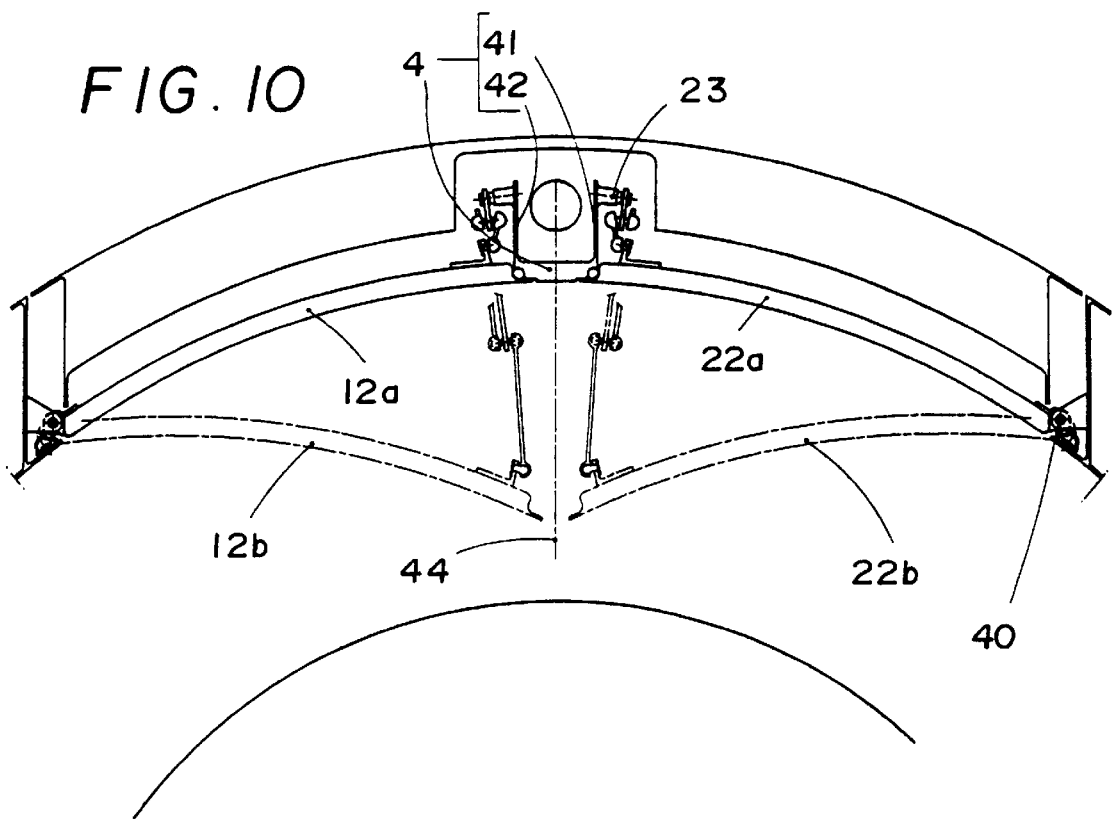
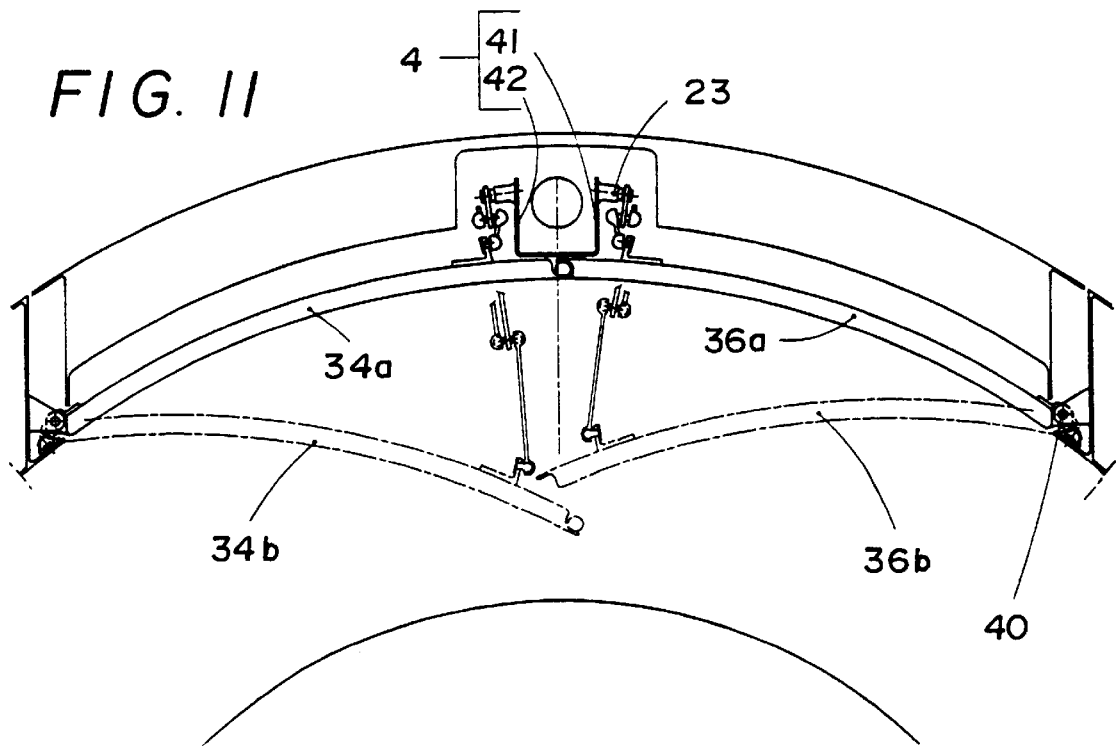

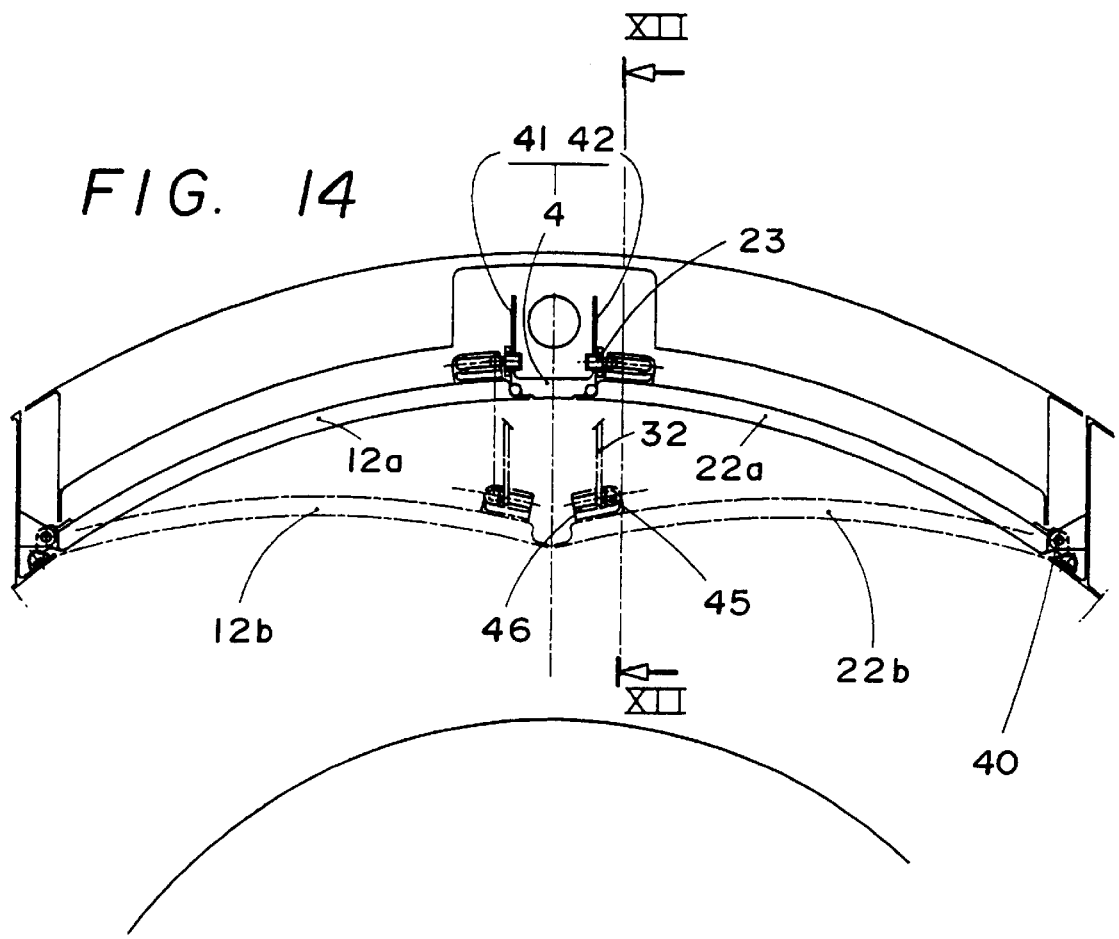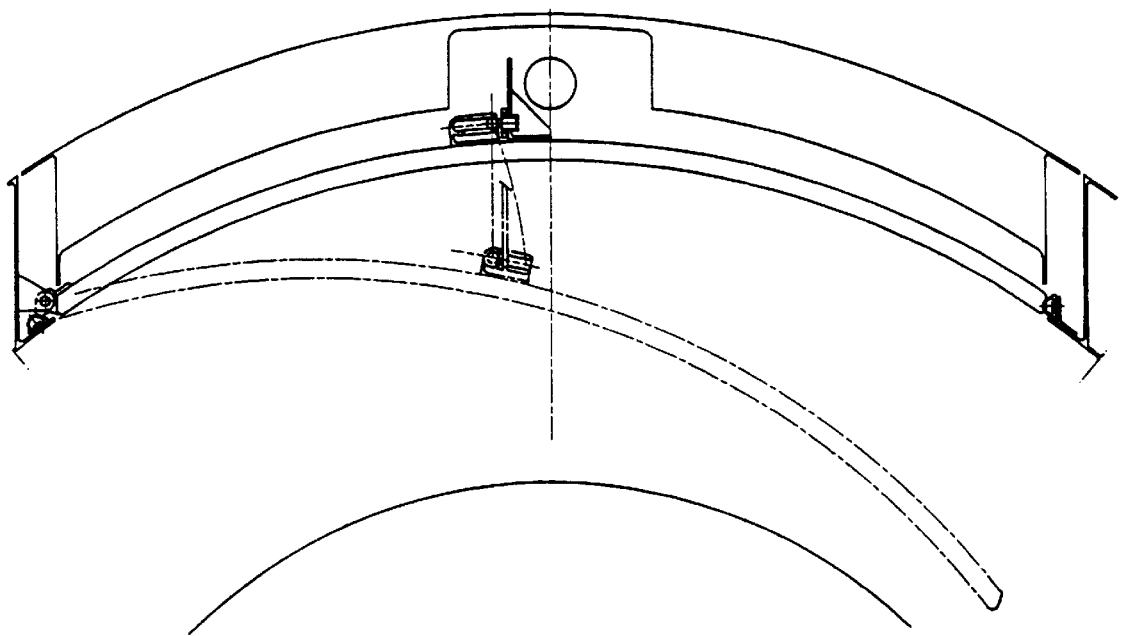

PIVOTING DOOR THRUST REVERSER WITH LATERALLY PIVOTING AUXILIARY PANEL

BACKGROUND OF THE INVENTION

The present invention relates to a pivoting door thrust reverser for a turbojet engine, more particularly a thrust reverser having auxiliary panels mounted on the cowling and cooperating with the pivoting thrust reverser door.

Turbofan-type turbojet engines are well known in the art and typically comprise a fan at the front of the turbojet engine which directs a flow of bypass air through a duct bounded on the inside by the engine cowling and on the outside by a fan cowling. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight as illustrated by arrow 12. The inner surface of the inner cowling panel defines the outer boundary of the bypass flow duct 15 through which the bypass flow air passes in the direction of arrow 14.

The fan cowling also comprises a thrust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends from an upstream portion 5 of the cowling axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner panel 11 of the thrust reverser door 7 even when the door is in its forward thrust position without extending into the bypass flow duct. This forms a cavity 17 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passages cleared by the forward portion of the thrust reverser doors which causes the door to be biased toward the open, thrust reversing direction. The full cross-section of the flow passages must be larger than the associated duct cross-section in a plane taken upstream, or forward, of the door on account of the pressure losses due to the gas flow deflection since the downstream, or rearward portion of the duct unobstructed by the inwardly protruding portion of the thrust reverser doors is minimized in order to produce an appropriate reverse thrust force.

Quite obviously, the bias of the door toward the open or reverse thrust position is a safety drawback. The reverser would be safer if the thrust reverser door was biased towards the closed or forward thrust position. This consideration also applies to a thrust reverser door that would tend to close again under pressure even if it was partially deployed towards the thrust reversing position.

In some cases, the effect of the pressure acting on the thrust reverser door is such that very high stresses are transmitted through the thrust reverser door actuators between their attachment points to the upstream portion of the cowling and the doors. As a consequence, this structure and the door locking mechanisms must be undesirably heavy.

European Patent 0 413 635 discloses a thrust reverser having a pivoting door associated with an interior panel that is directly linked to the door. Thus, when the thrust reverser door pivots about is pivot axis, the associated panel pivots about the panel pivot axis in the same direction as the door. This design includes a drawback that the inner panel acts as a shield for the reverse thrust gas flow so as to prevent optimum guidance of the reverse thrust gas flow by the thrust reverser door.

SUMMARY OF THE INVENTION

A thrust reverser is disclosed for a turbojet engine having a cowling forming an outer boundary of a gas flow duct through which gases flow from a front to a rear, the cowling having at least one reverse thrust opening communicating with the gas flow duct and a thrust reverser door pivotally connected to the cowling so as to move between a forward thrust position wherein the thrust reverser door covers the reverse thrust opening, and a reverse thrust position wherein the reverse thrust opening is uncovered and the thrust reverser door directs at least a portion of the gases flowing through the duct through the reverse thrust opening. The thrust reverser also includes at least one panel having an inner surface, a first lateral side pivotally connected to the cowling so as to pivot about a panel pivot axis extending generally parallel to the gas flow direction through the duct and an actuating mechanism connected to a second lateral side of the panel so as to move the panel about the panel pivot axis between a first position in which the inner surface forms a portion of the outer boundary of the gas flow duct and a second position wherein the second lateral side is disposed within the gas flow duct. The actuating mechanism may include a mechanical linkage interconnecting the second lateral side of the panel to the thrust reverser door such that movement of the thrust reverser door between the forward and reverse thrust positions causes movement of the panel between the first and second positions.

An object of the present invention is to provide an auxiliary panel that is acted on by the gases flowing through the duct such that the forces thereon cause the thrust reverser door to be biased toward the forward thrust position when the door is in its forward thrust position or slightly displaced therefrom.

The present invention prevents accidental deployment of the thrust reverser door from its forward thrust position by utilizing existing gas pressures in the gas flow duct, thereby reducing the forces acting on the door and enabling its components to be fabricated from lighter materials. Thus, the overall weight of the thrust reverser system is reduced compared to the known systems.

BRIEF DESCRIPTION OF THE DRAWINGS

FIG. 10 is a transverse cross-sectional view taken along line X—X in FIG. 8 illustrating the panels in the first and second positions.

FIG. 11 is a view similar to FIG. 10 illustrating an alternate panel configuration from that illustrated in FIG. 10.

FIG. 14 is a transverse cross-sectional view taken along line XIV—XIV in FIG. 12.

FIG. 15 is a transverse cross-sectional view similar to FIG. 15 illustrating an alternative panel construction.

DETAILED DESCRIPTION OF THE PREFERRED EMBODIMENTS

Figure 1:
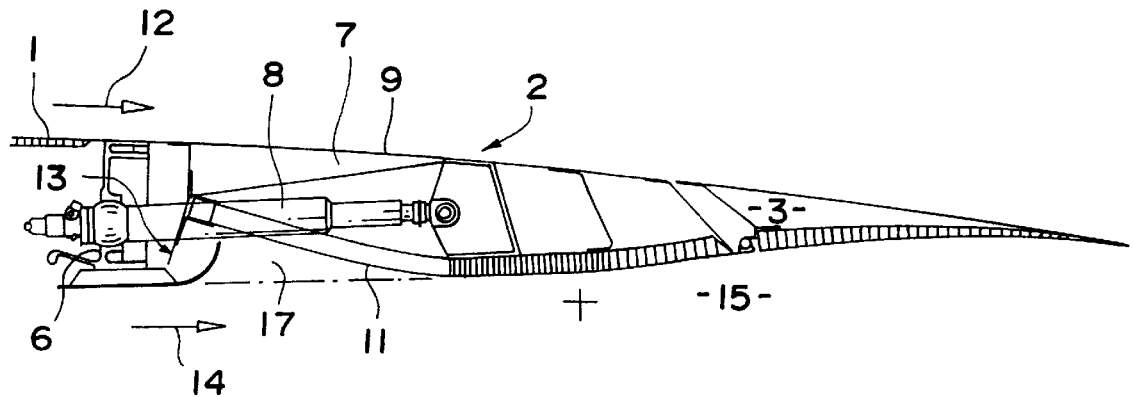
FIG. 1 is a partial, longitudinal, cross-sectional view of a known type of pivoting door thrust reverser with the thrust reverser door in its forward thrust position.
Figure 2:
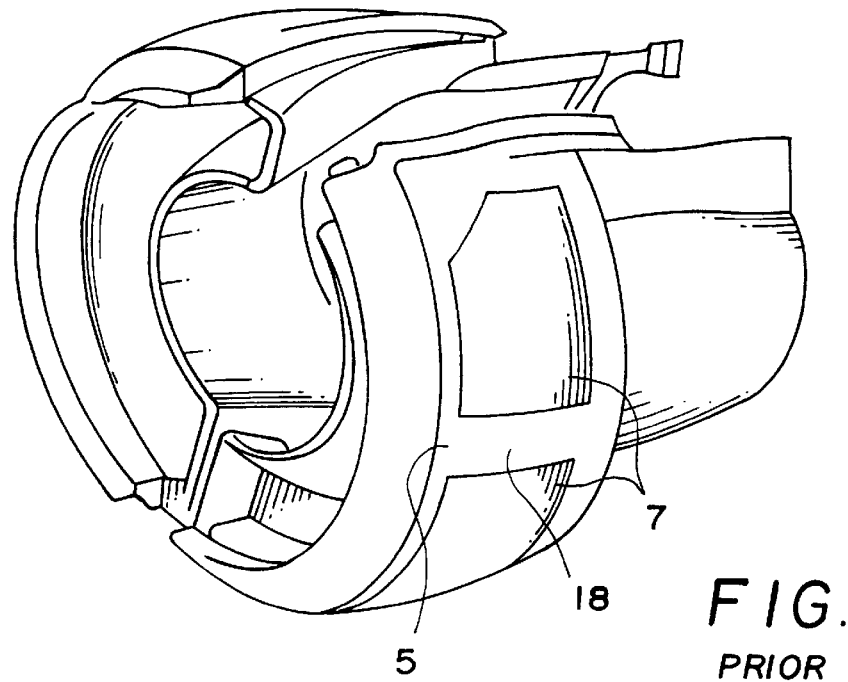
FIG. 2 is a perspective view of a cowling incorporating the known thrust reversers circumferentially spaced apart about the cowling.

In the descriptions of the various embodiments of the present invention, the portions of the cowling and thrust reverser door having the same or similar structure and/or function as the known prior art device illustrated in FIGS. 1 and 2 have been assigned the same identifying numerals. Thus, the present invention encompasses an engine cowling 1, a thrust reverser door 7 pivotally attached thereto and a downstream fairing 3. The thrust reverser door 7 has an outer surface 9 and an inner surface 11 and has a deflector 13 located on its forward edge. A door actuator 8 extends between the cowling and the thrust reverser door 7 and has an extendible and retractable rod to move the thrust reverser door 7 between the forward thrust position, illustrated in FIG. 3, and the reverse thrust position, illustrated in FIG. 4.

Figure 3:
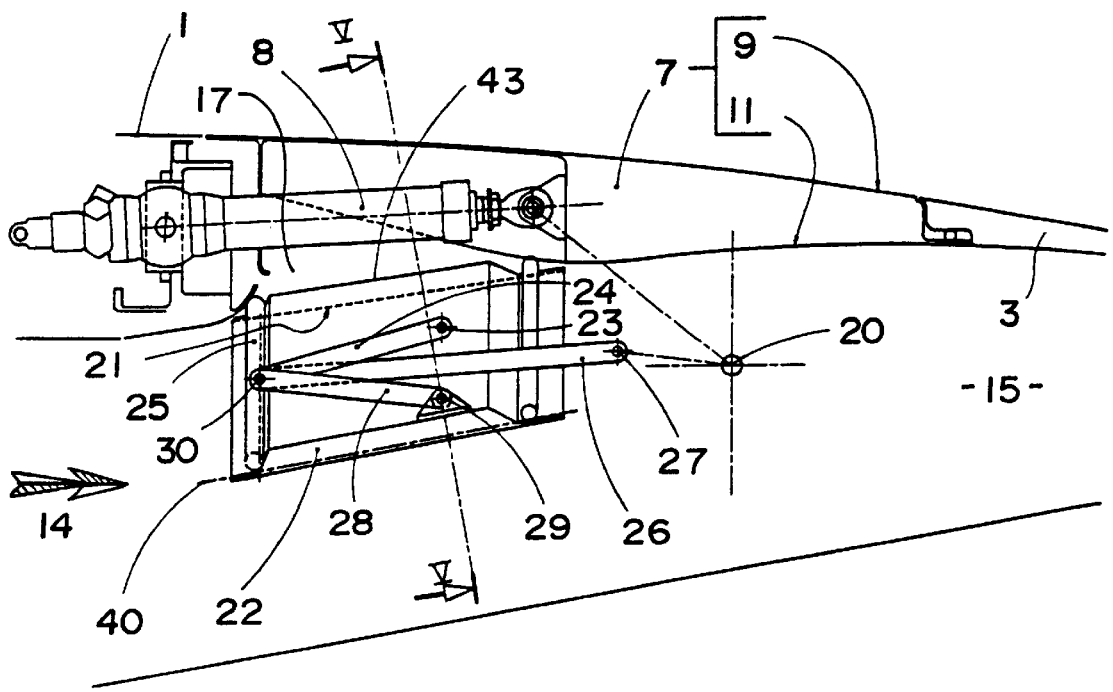
FIG. 3 is a partial, longitudinal, cross-sectional view of a first embodiment of the thrust reverser according to the present invention with the thrust reverser door in the forward thrust position.
Figure 5:
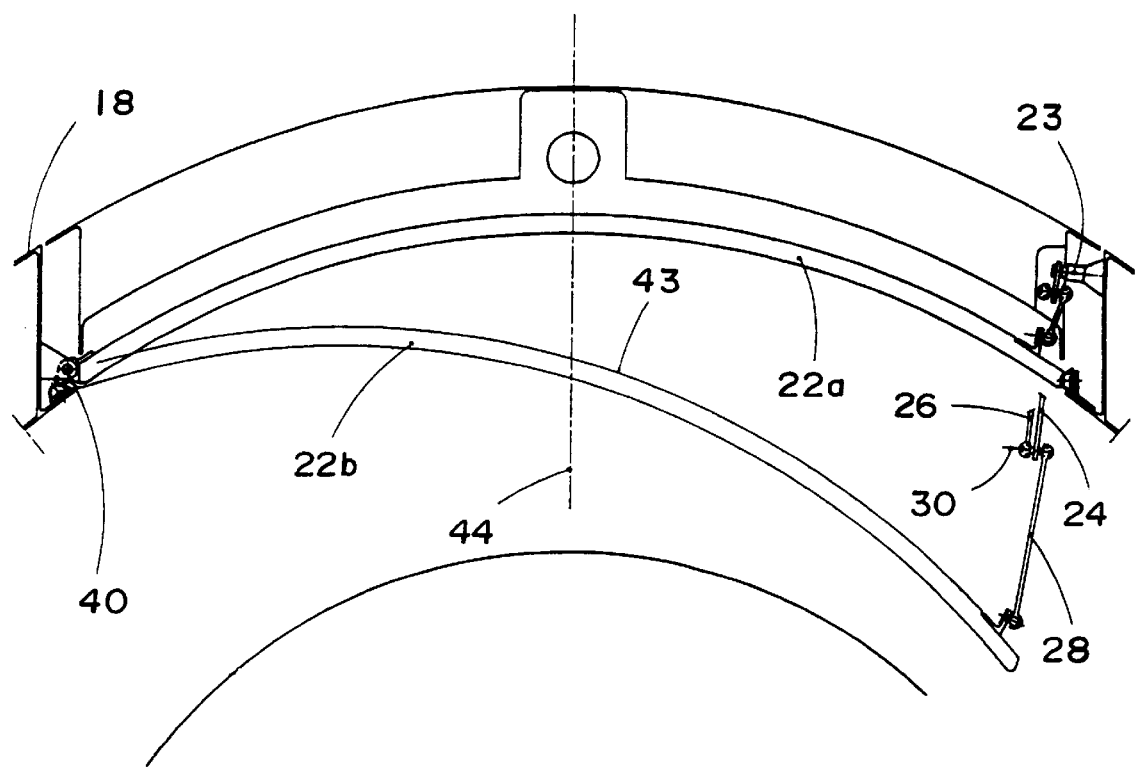
FIG. 5 is a cross-sectional view taken along line V—V in FIG. 3 illustrating the panel in its first and second positions.

The thrust reverser according to the present invention has an auxiliary panel 22 with an inner surface 21 forming portion of the outer boundary of the gas flow duct 15 when the panel 22 is located in the first position, as illustrated in FIG. 3 and at 22a in FIG. 5. Seals 25 are interposed between the panel 22 and the cowling 1, and the panel 22 and the thrust reverser door 7 between which the panel 22 extends. The seals prevent the air within the duct 15 from passing into the cavity 17. Although the seal 25 is illustrated as being attached to the panel 22, it is to be understood that the seal may be attached to the cowling 1 or the thrust reverser door 7.

The panel 22 is curved in the transverse direction, as best illustrated in FIG. 5, and has first and second opposite lateral sides. The first lateral side is pivotally connected to portion 18 of the cowling 1 so as to pivot about a pivot axis 40 that extends generally in the direction of the gas flow through the duct 15. The opposite, second lateral side of the panel 22 is connected to an actuating mechanism which causes the second lateral side to move between the first position, illustrated in FIG. 3 and at 22a in FIG. 5, and a second position, illustrated in FIG. 4 and at 22b in FIG. 5. In the second position, the second lateral end of the panel 22 extends into the gas flow duct 15.

Figure 4:
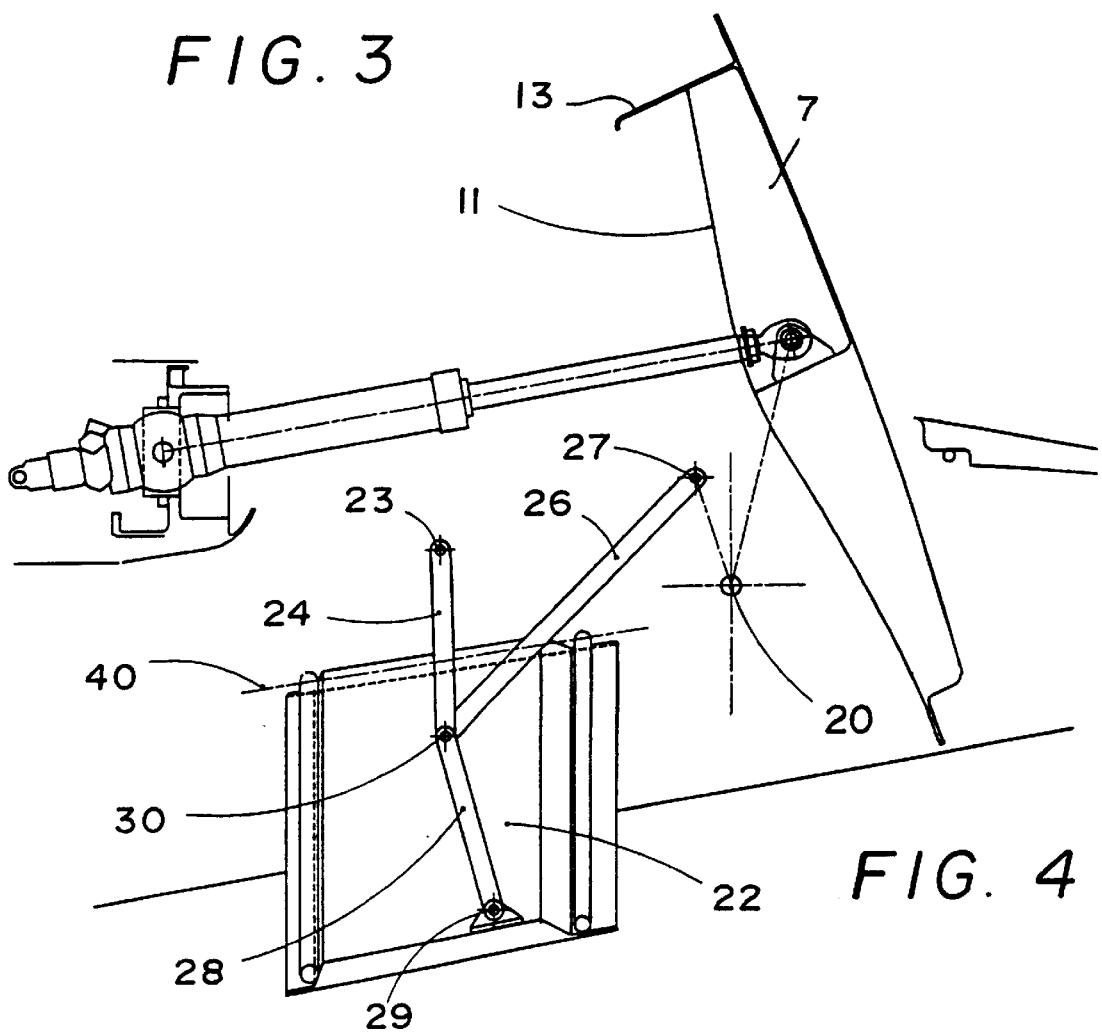
FIG. 4 is a view similar to FIG. 3 illustrating the thrust reverser door in the reverse thrust position.

The actuating mechanism may comprise a mechanical linkage having a link rod 24 pivotally attached to the portion 18 of the cowling at pivot point 23 and having a second end. A second link 28 is pivotally connected to the second lateral side of the panel 22 at pivot point 29 and is pivotally connected to the second end of the link rod 24 at pivot connection 30. Link rod 26 is also pivotally connected at pivot 30 and is pivotally connected to the thrust reverser door 7. Thus, as can be seen in FIGS. 3 and 4, as the thrust reverser door 7 pivots about the door pivot axis 20 between the forward and reverse thrust positions, the panel 22 will be moved between its first and second positions.

Figure 6:
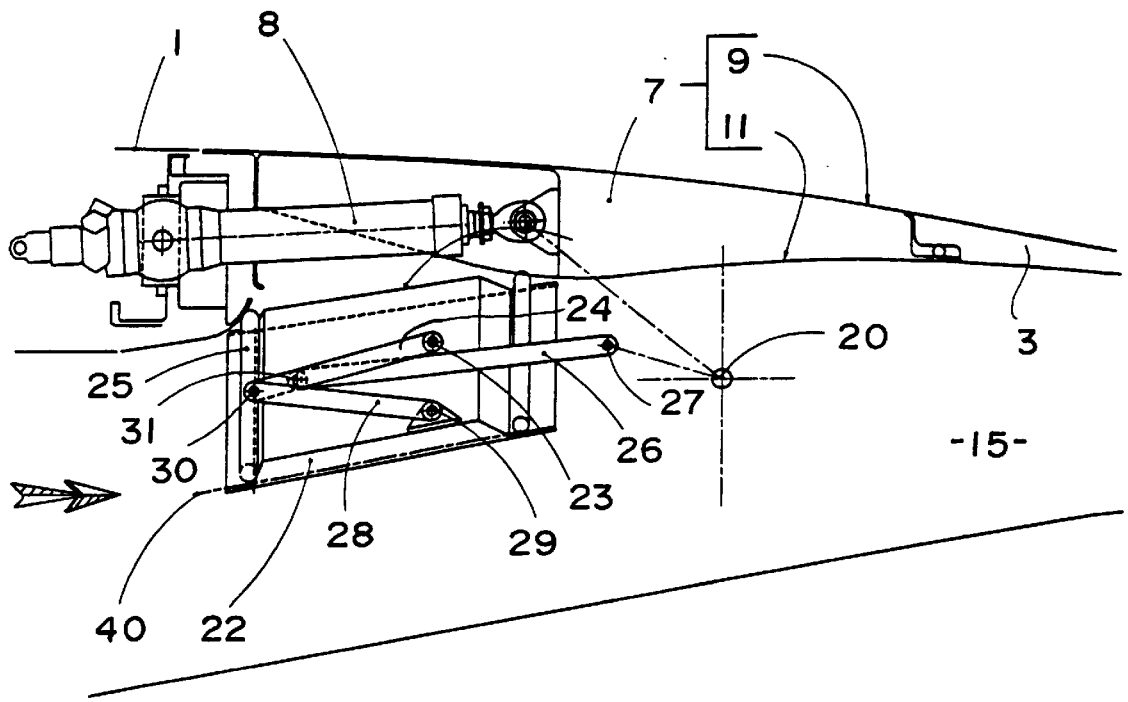
FIG. 6 is a partial, longitudinal, cross-sectional view of a second embodiment of the present invention with the thrust reverser door in the forward thrust position.
Figure 7:
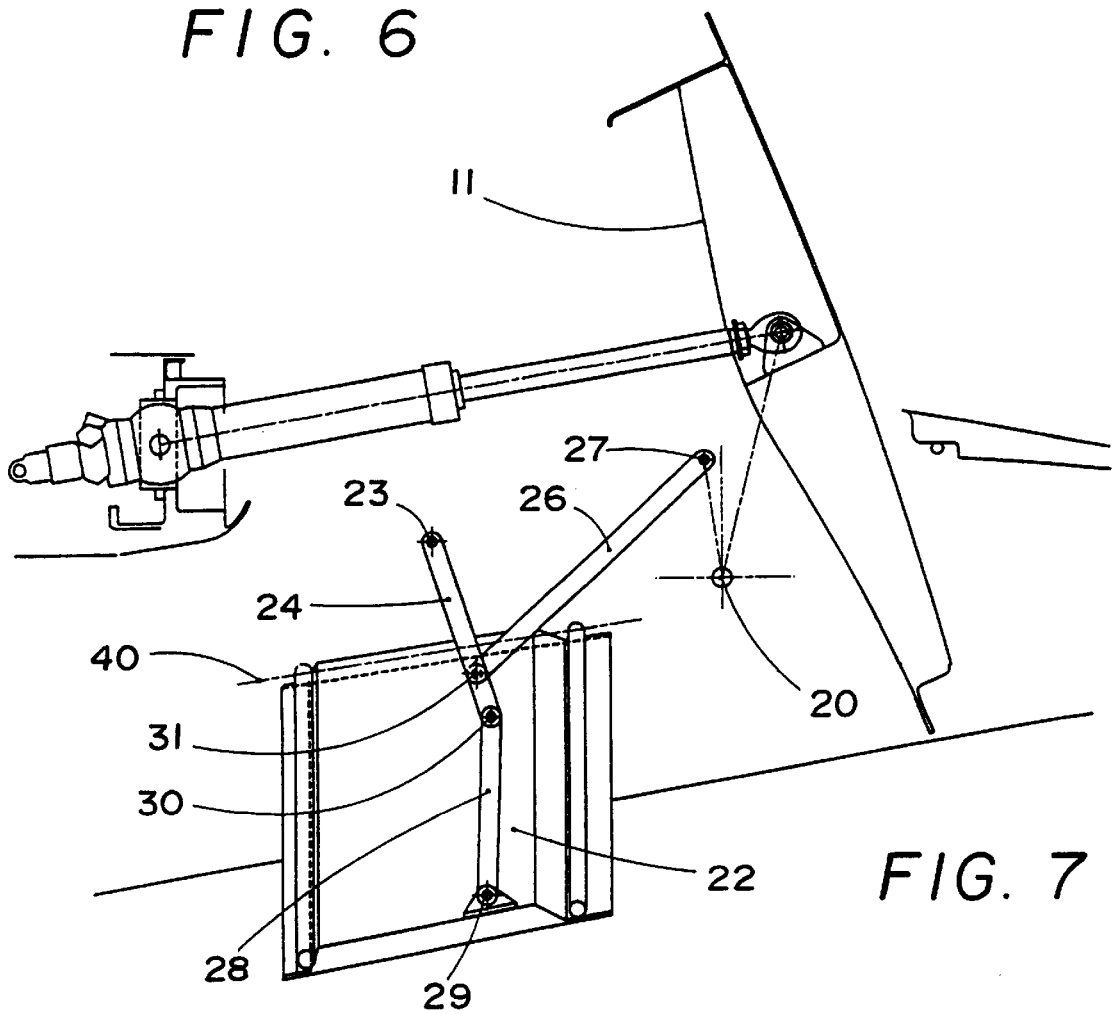
FIG. 7 is a view similar to FIG. 6 illustrating the thrust reverser door in the reverse thrust position.

Alternatively, as illustrated in FIGS. 6 and 7, the link rod 26 may be pivotally attached to the link rod 24 at pivot 31 between the first and second ends of the link rod 24.

In order to facilitate the smooth motion of the mechanical linkage, all of the pivot points 23, 30, 29 and 31 may be spherical swivel connectors to accommodate slight lateral movement of the link rod with respect to each other and with respect to the panel 22.

The lengths of the various link rod, as well as their connection points to the cowling, the panel and the thrust reverser door may be adjusted so as to achieve the optimum position of the panel relative to the thrust reverser door to obtain the optimum results in any given application of this system. The orientation of the panel 22 in its second position depends upon the orientation of the pivot axis 40 relative to the stationary structure and the positions of the hinge points 23, 27, 29 and 30, as well as the lengths of the link rods 24, 26 and 28.

The orientation of the panel 22 in the second position may be optimized such that the longitudinal dimension of its panel 22 remains substantially parallel to the direction of flow 14 through the gas flow duct 15 to thereby minimize disturbances in the gas flow. The panel 22 may also have various configurations of its outer surface 43 to guide the gas flow in the desired direction towards the thrust reverser door 7. Again, the precise configuration will depend upon the specific application.

As illustrated in FIG. 5, the panel 22 is transversely centered on the transverse center of the thrust reverser door 7, illustrated by line 44.

As an alterative to the mechanical linkage linking the panel 22 to the thrust reverser door 7, a separate linear actuator may be mounted between the stationary structure 1 and the attachment pivot point 29 on the panel 22. Any known type of actuator, such as electrical, hydraulic, pneumatic, single acting or telescoping may be utilized without exceeding the scope of the invention. In this variation, the actuation of the actuator and, consequently, the panel 22 may be integrated with the operation of the thrust reverser door 7, or may be made completely separate from the door operation.

The embodiment illustrated in FIGS. 6 and 7 is identical to the embodiment illustrated in FIGS. 3–5 except for the attachment point of link rod 26 to the actuating mechanism. In this embodiment, link rod 26 is pivotally connected to the thrust reverser door at 27, as in the embodiment previously described, but the opposite end is pivotally attached to the link rod 24 at pivot point 31. Pivot point 31 is located between the pivot connections 23 and 30.

Figure 8:
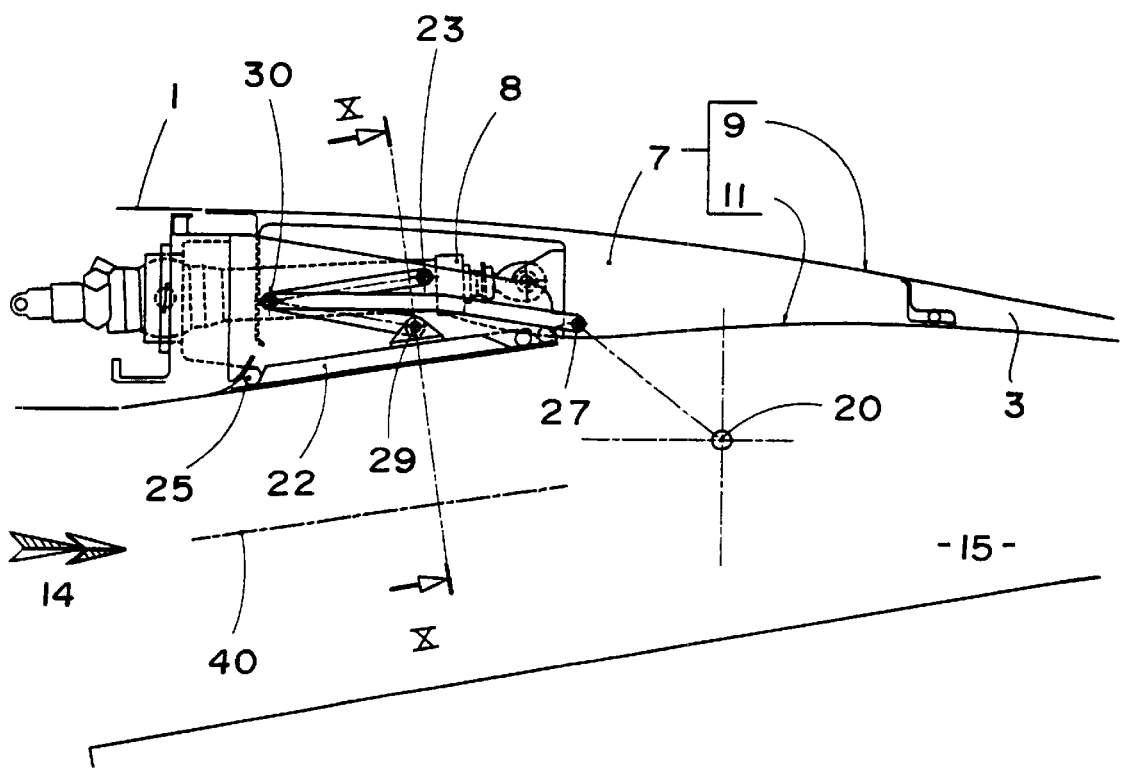
FIG. 8 is a partial, longitudinal, cross-sectional view of a third embodiment of the thrust reverser according to the present invention with the thrust reverser door in the forward thrust position.
Figure 9:
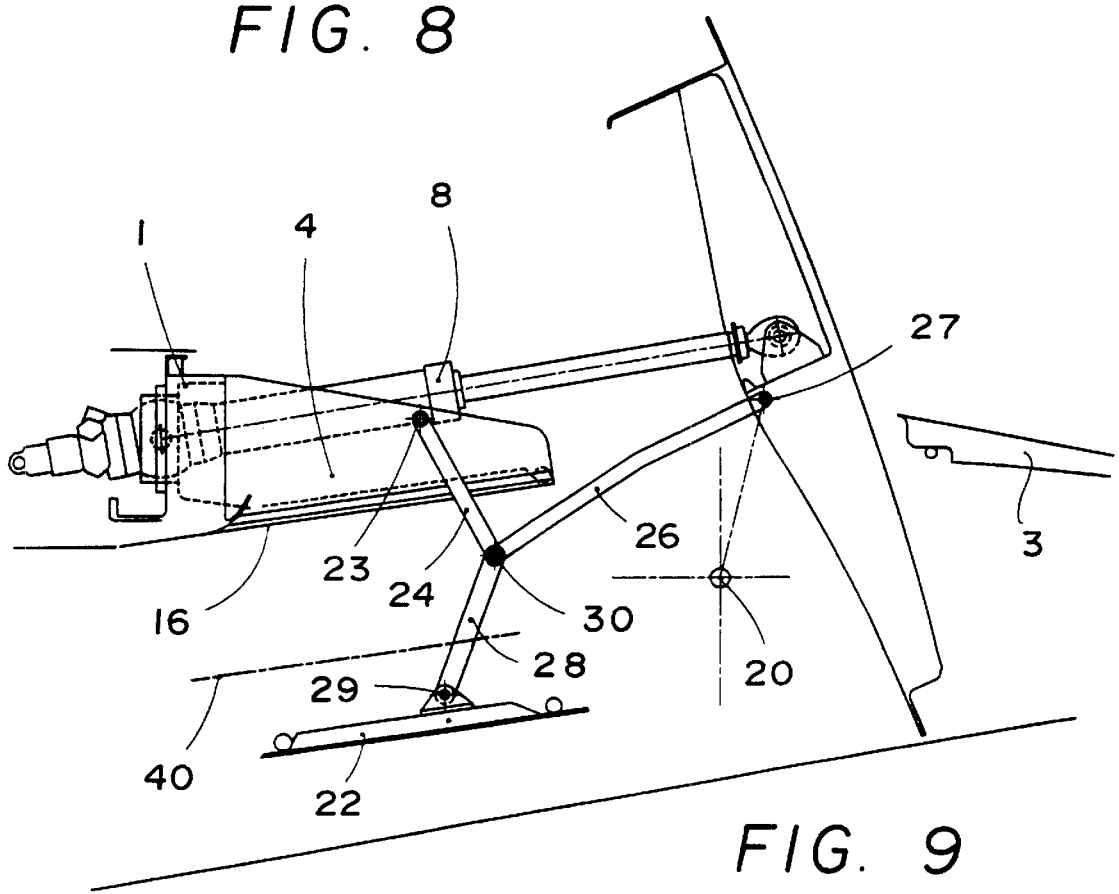
FIG. 9 is a view similar to FIG. 8 illustrating the thrust reverser door in the reverse thrust position.

An alterative embodiment of the invention is illustrated in FIGS. 8, 9 and 10. This embodiment utilizes a mechanical linkage and differs from the previously described embodiment insofar as each thrust reverser door is associated with two panels identified as elements 12 and 22 in FIG. 10. Each of the panels has first and second opposite lateral sides with the first lateral sides of each panel being pivotally attached to the cowling 1 so as to pivot about axes 40, again extending generally parallel to the direction of gas flow through the duct 15. The second, opposite lateral sides of each of the panels 12 and 22 are located adjacent to each other and adjacent to the lateral center of the thrust reverser door 7, illustrated by line 44 in FIG. 10. The linkage connected to each of the second lateral sides comprises a first link rod 24 pivotally attached at pivot point 23 to a mounting member 4 extending from the cowling 1 into the reverse thrust opening. Second link rod 28 is pivotally attached to a panel 12, 22 at pivot points 29 and is pivotally connected to an end of link rod 24. Third link rod 26 is pivotally connected to the thrust reverser door 7 and to the pivot point 30 joining link rods 24 and 28. As can be seen, movement of the thrust reverser door 7 between the forward thrust position illustrated in FIG. 8 and the reverse thrust position, illustrated in FIG. 9, will cause the panels 12 and 22 to move from their first positions, illustrated at 12a, 22a in FIG. 10 to their second positions, illustrated at 12b and 22b in which the second lateral ends are located in the gas flow duct 15.

FIG. 11 discloses a variation of this embodiment in which the second lateral ends of panels 34 and 36 overlap and have a seal therebetween to prevent leakage of the gases from the duct 15. As best seen in FIG. 11, these panels 34 and 36 are movable between their first positions, illustrated at 34a ad 36a, to their second positions, illustrated at 34b and 36b.

The pivot axes 40 of the panels 12, 22 and 34, 36 may extend parallel to each other, or may be oriented obliquely with respect to each other. The orientation of the axes, as well as the dimensions of the kinematic linkage, may be determined for each specific application to achieve the optimum results.

Figure 12:
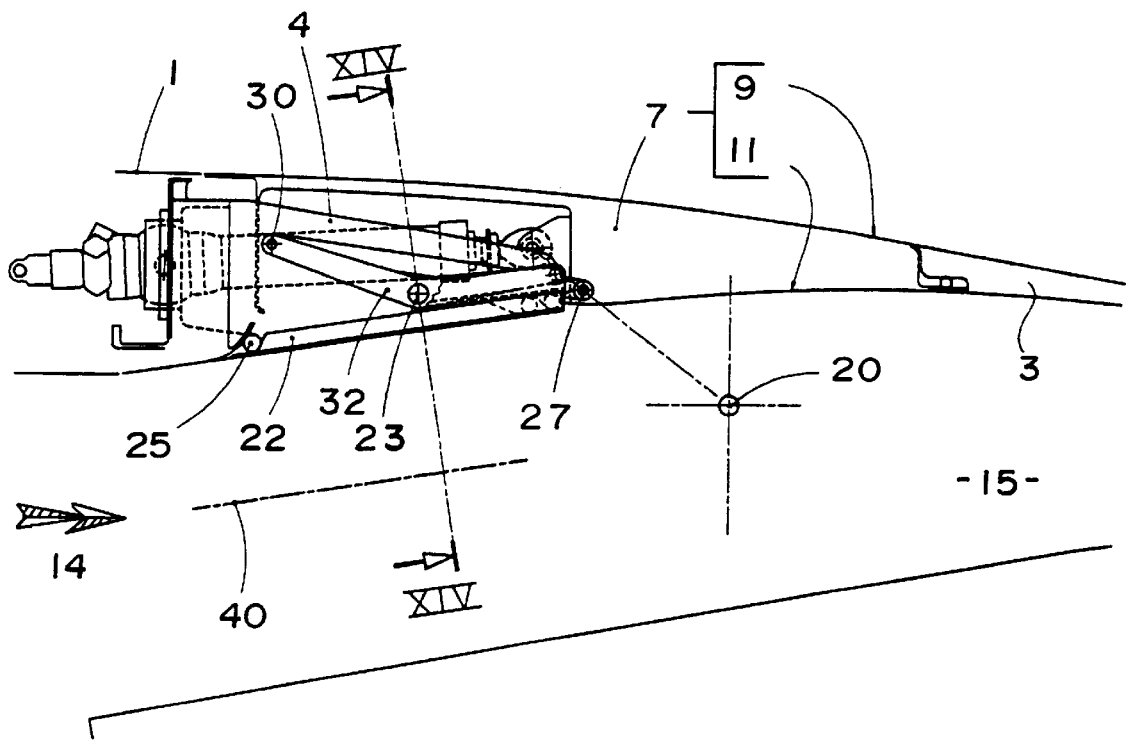
FIG. 12 is a partial, longitudinal, cross-sectional view of a fourth embodiment of the present invention with the thrust reverser door in the forward thrust position.
Figure 13:
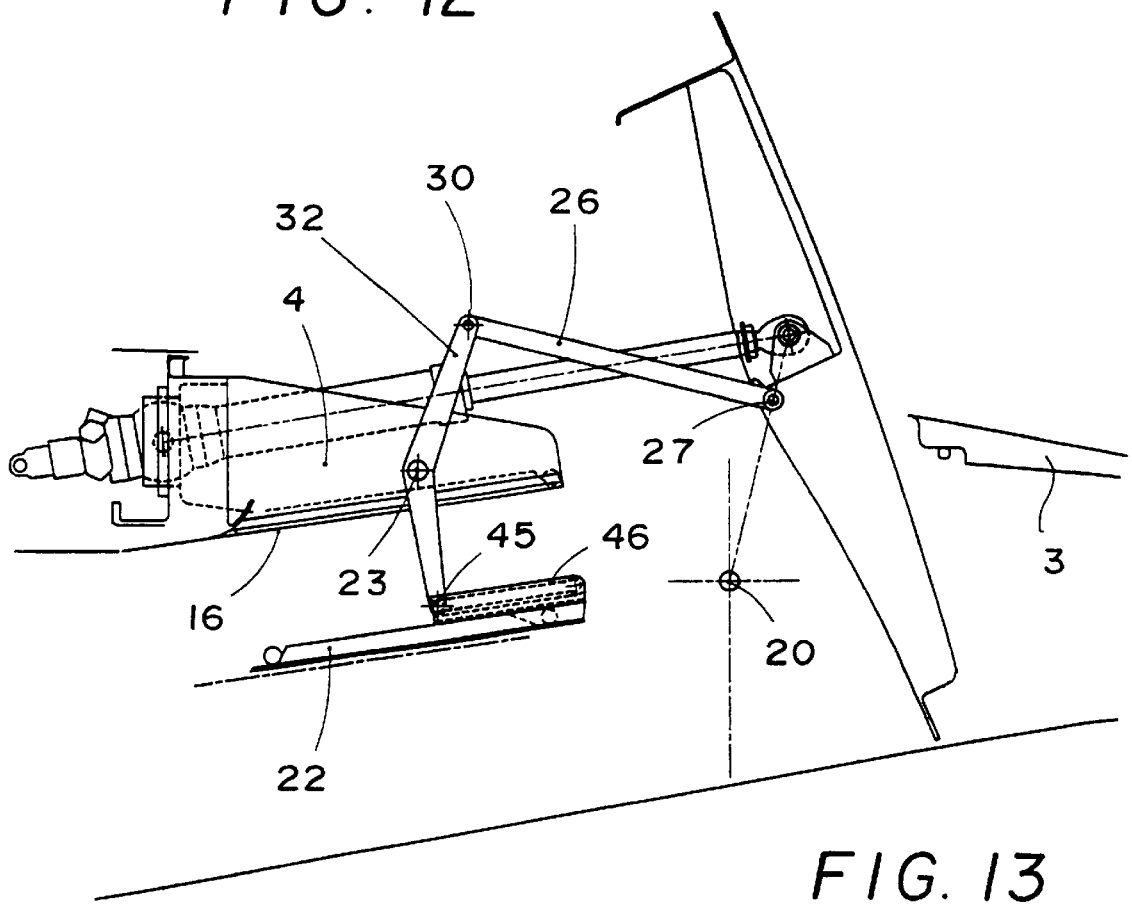
FIG. 13 is a view similar to FIG. 12 with the thrust reverser door in the reverse thrust position.

Another embodiment of the invention is illustrated in FIGS. 12, 13 and 14. This embodiment again employs two panels 12, 22 for each thrust reverser door 7 and a mechanical linkage connecting the second lateral sides of each panel to the thrust reverser door 7. In this embodiment, the second lateral side of each door 12, 22 has an elongated slot 46 engaged by a ball connector 45 fastened to an end of link rod 32. As best illustrated in FIG. 13, link rod 32 is pivotally attached to support member 4 at pivot point 23. The opposite end of link rod 32 is pivotally connected to link rod 26 at pivot point 30. Link rod 26 is, in turn, pivotally connected to the thrust reverser door 7 at pivot point 27.

As the thrust reverser door 7 moves between its forward and reverse thrust positions, the mechanical linkage mechanism will move the panels 12, 22 between their first positions, illustrated at 12a and 22a in FIG. 14 and their second positions, illustrated at 12b, 22b.

FIG. 15 is a cross-sectional view similar to FIG. 14 illustrating the mechanical connecting linkage of FIGS. 12–14 applied to move a single panel 22. The single panel again defines an elongated slot 45 engaged by a ball connector connected to a mechanical linkage the same as illustrated in FIGS. 12 and 13. Movement of the thrust reverser door 7 will move the panel between the positions shown in solid lines and dotted lines in FIG. 15.

A cowling may incorporate a plurality of thrust reverser doors and may include panels having all of the same configuration, or panels having various ones of the aforedescribed configurations.

The foregoing description is provided for illustrative purposes only and should note be construed as in any way limited this invention, the scope of which is defined solely by the appended claims.

We claim:

1. A thrust reverser for a turbojet engine having a cowling forming an outer boundary of a gas flow duct through which gases flow from a front to a rear, the cowling having at least one reverse thrust opening communicating with the gas flow duct, the thrust reverser comprising:
   a) a thrust reverser door pivotally connected to the cowling so as to move between a forward thrust position wherein the thrust reverser door covers the at least one reverse thrust opening, and a reverse thrust position wherein the at least one reverse thrust opening is uncovered and the thrust reverser door directs at least a portion of the gases flowing through the duct through the at least one reverse thrust opening;

b) at least one panel having an inner surface, a first lateral side pivotally connected to the cowling so as to pivot about a panel pivot axis extending generally parallel to the gas flow direction through the duct, and a second, opposite lateral side; and c) an actuating mechanism connected to the second lateral side of the at least one panel so as to move the at least one panel about the panel pivot axis between a first position wherein the inner surface of the at least one panel forms a portion of the outer boundary of the gas flow duct, and a second position wherein the second lateral side is disposed within the gas flow duct.

2. The thrust reverser of claim 1 wherein the actuating mechanism is connected to the thrust reverser door such that movement of the thrust reverser door between the forward and reverse thrust positions causes movement of the at least one panel between the first and second positions.

3. The thrust reverser of claim 1 wherein the actuating mechanism comprises:

a) a first link rod having a first end pivotally connected to the cowling and a second end;

b) a second link rod having a first end connected to the second lateral side of the at least one panel, and a second end pivotally connected to the second end of the first link rod; and, c) a third link rod pivotally connected to the thrust reverser door and to the first link rod.

4. The thrust reverser of claim 3 wherein the third link rod is connected to the second end of the first link rod.

5. The thrust reverser of claim 1 wherein the actuator mechanism comprises:

a) an elongated slot formed on the at least one panel;

b) a first link rod pivotally connected to the cowling at a pivot point, and having a first end slidably engaging the elongated slot and a second end; and, c) a second link rod pivotally connected to the thrust reverser door and to the second end of the first link rod.

6. The thrust reverser of claim 1 wherein the at least one panel comprises first and second panels, each having a first lateral side connected to the cowling so as to pivot about first and second panel pivot axes.

7. The thrust reverser of claim 6 wherein second lateral sides of each panel are adjacent to each other and to a lateral center of the thrust reverser door.

8. The thrust reverser of claim 6 wherein second lateral sides of each panel overlap when the first and second panels are in the first positions.

9. The thrust reverser of claim 6 wherein the first and second panel pivot axes are generally parallel to each other.

10. The thrust reverser of claim 6 wherein the first and second panel pivot axes extend obliquely to each other.

11. The thrust reverser of claim 6 further comprising a mounting member extending from the cowling into the at least one reverse thrust opening to which the actuating mechanism is attached.

* * * * *

UNITED STATES PATENT AND TRADEMARK OFFICE
CERTIFICATE OF CORRECTION

PATENT NO. : 6,009,702
DATED : January 4, 2000
INVENTOR(S) : GONIDEC et al.

It is certified that error appears in the above-indentified patent and that said Letters Patent is hereby corrected as shown below:

Title Page,

Item [75] Third named inventor should read -- Guy Bernard Vauchel --

Signed and Sealed this

Sixteenth Day of January, 2001

Attest:

Q. TODD DICKINSON

*Attesting Officer*       *Commissioner of Patents and Trademarks*